US009770994B2

(12) United States Patent
Bianco et al.

(10) Patent No.: US 9,770,994 B2
(45) Date of Patent: Sep. 26, 2017

(54) MULTIPLE EVSE INSTALLATION WITH POWER SHARING SYSTEM FOR EVSE PAIRS SHARING A CIRCUIT BREAKER

(71) Applicants: James S. Bianco, Suffield, CT (US); John Fahy, Longmeadow, MA (US)

(72) Inventors: James S. Bianco, Suffield, CT (US); John Fahy, Longmeadow, MA (US)

(73) Assignee: Control Module, Inc., Enfield, CT (US)

( * ) Notice: Subject to any disclaimer, the term of this patent is extended or adjusted under 35 U.S.C. 154(b) by 329 days.

(21) Appl. No.: 14/731,945

(22) Filed: Jun. 5, 2015

(65) Prior Publication Data

US 2015/0352971 A1 Dec. 10, 2015

Related U.S. Application Data

(60) Provisional application No. 62/008,585, filed on Jun. 6, 2014.

(51) Int. Cl.
*B60L 11/18* (2006.01)

(52) U.S. Cl.
CPC ....... *B60L 11/1848* (2013.01); *B60L 11/1844* (2013.01); *B60L 2240/70* (2013.01); *Y02E 60/721* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(58) Field of Classification Search
CPC ...... Y02S 10/126; Y02S 30/14; Y02E 60/721; B60L 11/1816
USPC ......................................................... 307/9.1
See application file for complete search history.

(56) References Cited

U.S. PATENT DOCUMENTS

2016/0075246 A1* 3/2016 Liptak ................. B60L 11/1816
320/109

* cited by examiner

*Primary Examiner* — Robert Deberadinis
(74) *Attorney, Agent, or Firm* — Alix, Yale & Ristas, LLP

(57) ABSTRACT

A multiple EVSE installation employs a power sharing system for EVSE pairs which share a common circuit breaker. When only one EVSE is connected to an electric vehicle for charging, the connected EVSE is allowed to charge at full capacity. When a second EV connects to the second EVSE of the pair, while the first EVSE is charging, a controller senses the latter event and issues commands to both EVSE units to limit their current so that the rated circuit breaker capacity is not exceeded. The controller continuously monitors the charging of each of the EVSE units and sends commands to adjust the supply of current to each EVSE accordingly.

16 Claims, 5 Drawing Sheets

MULTIPLE EVSE INSTALLATION WITH POWER SHARING SYSTEM FOR EVSE PAIRS SHARING A CIRCUIT BREAKER

CROSS-REFERENCE TO RELATED APPLICATION

This application claims the priority of U.S. Provisional Patent Application No. 62/008,585 filed on Jun. 6, 2014, the entirety of which is incorporated herein by reference.

BACKGROUND

This disclosure relates generally to electric vehicle supply equipment (EVSE) installations for charging an electric vehicle (EV). More particularly, this disclosure relates to methods and equipment for sharing and allocating power among multiple EVSE units.

The disclosure addresses an EVSE installation wherein two EVSE units share a common power line and a circuit breaker. In one disclosed application, the disclosure illustrates how the power utilized by each EVSE is effectively and efficiently controlled when two EVSE units are sharing a common circuit breaker, such as, for example, a 40 A circuit breaker. Pursuant to standard practice, the continuous power supplied by the breaker is 80% of its rated capacity—which is 32 A for a 40 A circuit breaker.

The ideal situation is for each Level 2 (30 A) EVSE to have its own dedicated 40 A circuit breaker. This is not always possible or practical for existing installations where there is already an existing EVSE and it is desired to add another EVSE to increase the number of charging parking spaces or situations wherein vehicles may be parked at the EVSE station for an extended time period. In many cases, one EV being charged may not be utilizing the full 30 A charge current available, and the remaining charge capacity could be utilized by a second EVSE to charge an additional EV.

SUMMARY

Briefly stated, a method for sharing power between a first EVSE and a second EVSE sharing a circuit breaker having a pre-established current rating and a reduced current capacity comprises connecting a first EVSE to an EV to begin a charge. The method involves charging a first EVSE at a charge limited by the current capacity while the second EVSE is not connected to an EV and then connecting the second EVSE to an EV to begin a charge. The method comprises transmitting a command to the first EVSE and the second EVSE to limit the charge of each to no more than one half of the current capacity. If either the first EVSE or the second EVSE stops charging, transmitting a restore command to charge the first EVSE or the second EVSE, that does not stop charging at a charge limited by the current capacity. The method further comprises the step wherein at a pre-established time after charging the second EVSE, evaluating the charge current of the first EVSE and the second EVSE. If the charging current of the first EVSE or the second EVSE is below one half of the current capacity, a reduce command is transmitted to one of the first EVSE or the second EVSE and an increase command to the other of the first EVSE or the second EVSE, respectively, to reduce and increase the charge to the one or the other EVSE, respectively.

In one embodiment, the method further comprises replicating the foregoing method for multiple pairs of a first EVSE and a second EVSE. A single controller controls all of the EVSE units for multiple pairs of a first EVSE and a second EVSE. In one embodiment, the method comprises compiling a running log of power drawn by the first and the second EVSE units. The ambient temperature may be sensed and the current capacity is correspondingly reduced. The method may also comprise automatically reducing the current capacity during peak power demand and/or automatically terminating power during a pre-established time period.

An EVSE installation is connected to a circuit breaker having a pre-established current rating and a reduced current capacity comprising the first EVSE having a first current control and connectable for power communication with the circuit breaker and a second EVSE having a second current control and being connectable for power communication with the circuit breaker. An installation controller issues command signals to the first and the second current controls. A first sensor senses the power drawn by the first EVSE and communicates with the installation controller. A second sensor senses the power drawn by the second EVSE and communicates with the installation controller. The installation controller transmits a command to the first EVSE and a command to the second EVSE to limit the charge to no more than one half of the current capacity when the first EVSE and the second EVSE are connected for charging. The installation controller issues a restore command to the first EVSE to charge one EVSE at a charge limited by the current capacity while the other EVSE is not connected to an EV or has stopped charging. The installation controller at a pre-established time after charging a second EVSE evaluates the charge current sent by the first sensor and the second sensor so that the charging current of one of the first EVSE or the second EVSE is below one half the current capacity. The installation controller transmits a reduce command to the EVSE and an increase command to the other EVSE to charge each EVSE at a reduced current charge and an increased current charge, respectively.

The first and second current control preferably has a range of approximately 6 amps to 30 amps. The installation controller is preferably disposed at a pay station module or a gateway module. In one embodiment, an integrated installation comprises a multiplicity of EVSE installations each comprising a pair of EVSE units connected to a common circuit breaker.

A single installation controller controls preferably all of the EVSE units. A pay station module or gateway module communicates over a Zigbee mesh network with the first and the second EVSE units.

DETAILED DESCRIPTION

Figure 1:
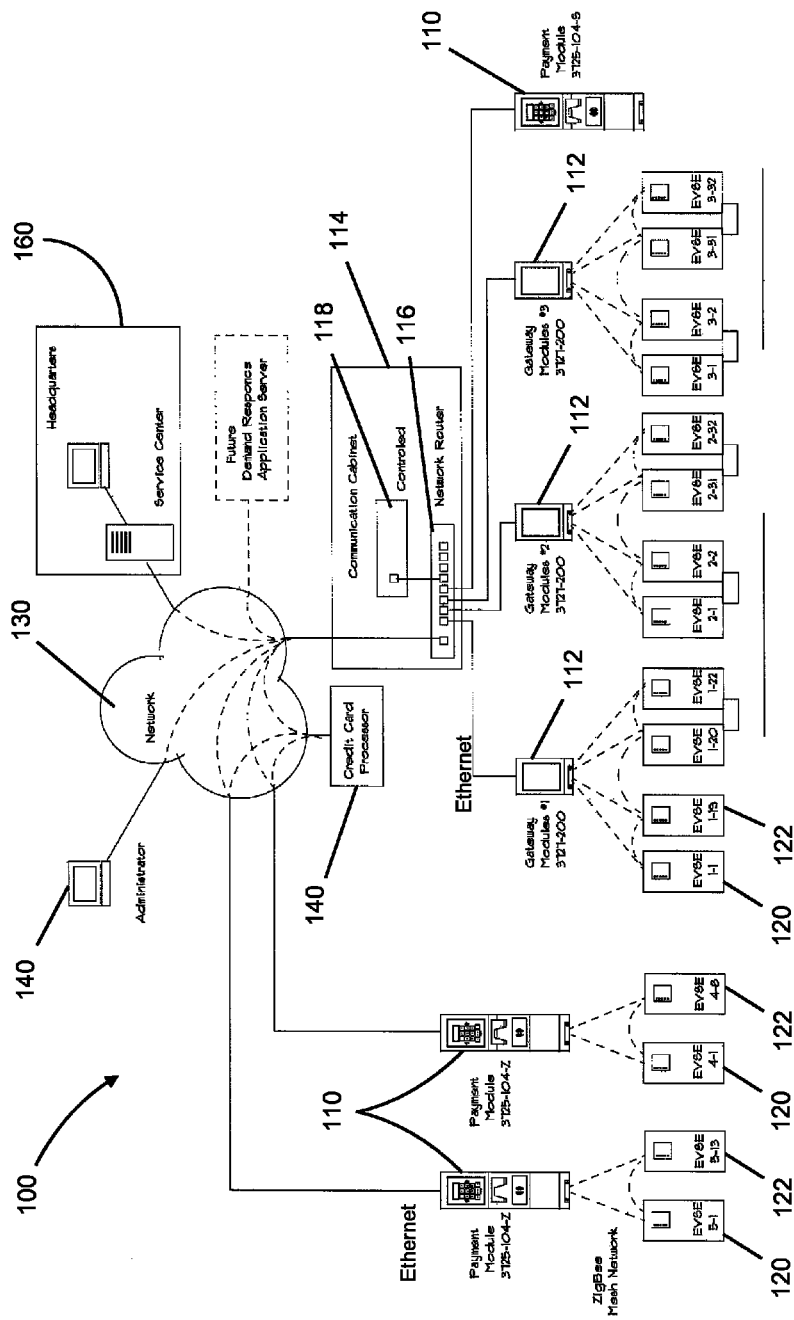
FIG. 1 is an annotated network block diagram for an integrated multi-locational electric vehicle charging installation which employs multiple EVSE stations and a power sharing system for at least some of the EVSE stations.
Figure 2:
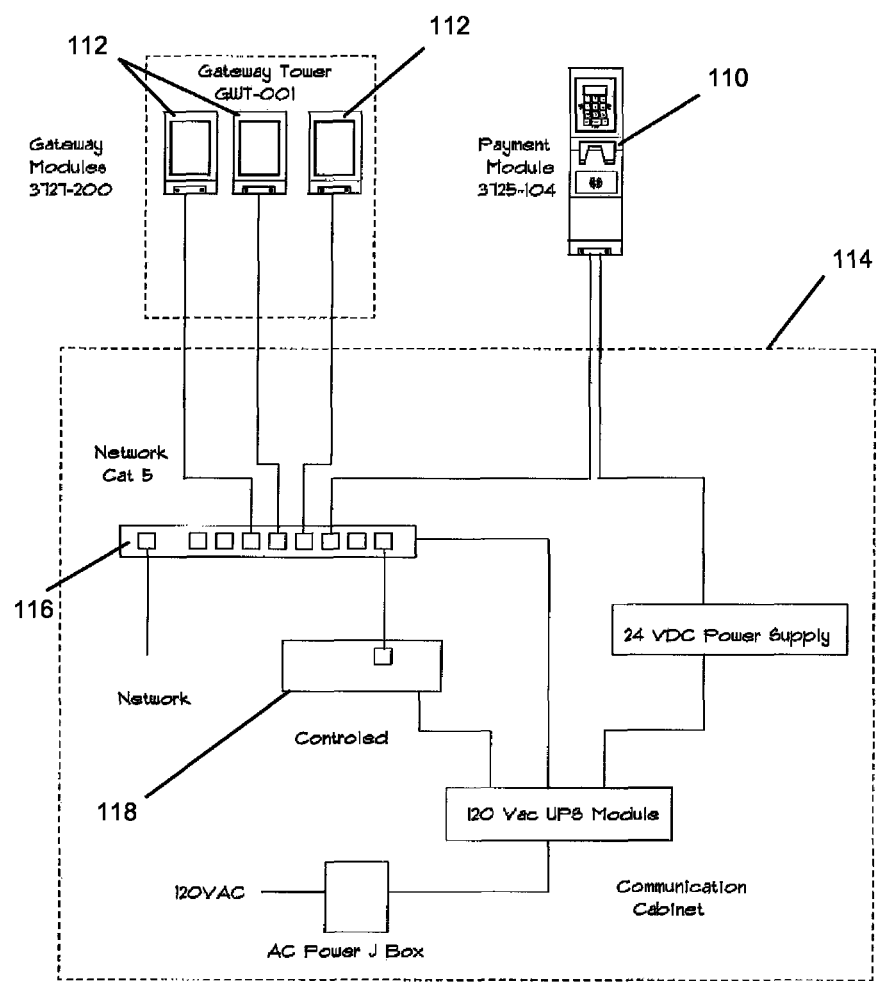
FIG. 2 is an enlarged annotated network block diagram for a portion of the EV charging installation of FIG. 1.

With reference to FIG. 1, an integrated electric vehicle charging installation which incorporates multiple EVSE stations and multiple charging locations and employs a power sharing system is generally designated by the numeral 100.

The disclosed intelligent power sharing system is a major step forward in the pursuit of reducing the electric power infrastructure cost. This is achieved by recognizing that all electric vehicle service equipment (EVSE) are not providing the maximum rated current at the same time and by organizing EVSE units in power sharing pairs.

The FIG. 1 representative EV charging installation 100 is intended to be illustrative of various possible applications and configurations for a power sharing system as disclosed below. The EV charging installation includes multiple payment modules 110 which present multiple transaction modes to interface with a vehicle user to access electric power and to pay for the consumed power. The payment modules 110, for example, preferably have a credit card or a debit card reader and a screen/keyboard and connect over the Ethernet with a network 130 which communicates with the credit card processor 140. Selected payment modules 110 communicate over a Zigbee mesh network with a pair of adjacent EVSE units 120 and 122 which share power for charging connected EVs.

For some applications, a standalone payment module 110 communicates with a communication cabinet 114 that provides external communication over the Ethernet or by various hardwired connection systems with gateway modules 112. The gateway modules 110 may connect with various tandem power sharing EVSE units 120 and 122 throughout the installation facility. The cabinet 114 houses a network router 116 which communicates with a network controller 118 and also externally with the network 130 to provide the various communication links. The network 130 also preferably connects with an administrator 150 and a service center 160 for the installation.

Figure 3:
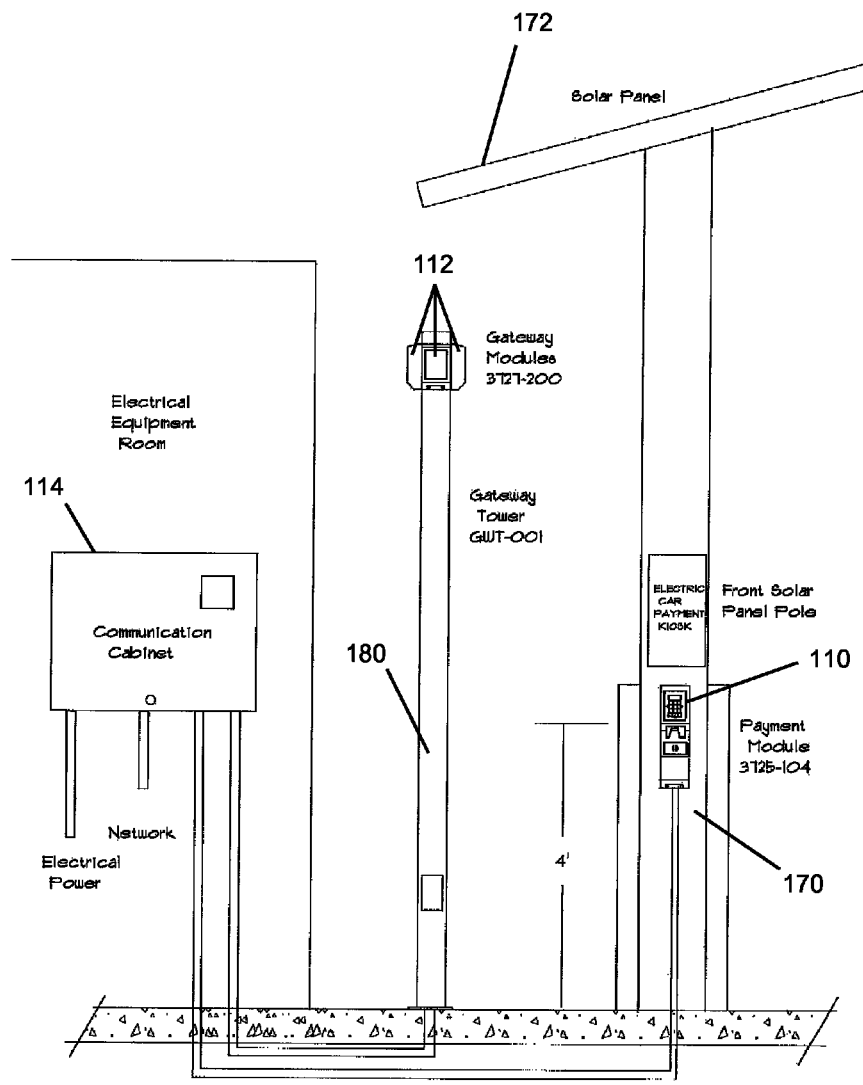
FIG. 3 is an annotated elevational view, partly in diagram form, of a portion of the EV charging installation of FIG. 1.

With additional reference to FIG. 3, a payment module 110 for some installation configurations is mounted to a support 170 for a solar panel 172 to provide sufficient power for communication and transaction purposes. One or more gateway modules 112 are mounted to a tower 180 for bi-directional wireless communication. It should be appreciated that the charging power for the various EVSE units is preferably transmitted through hardwired conduits which are disposed under the surface of the installation.

Figure 4:
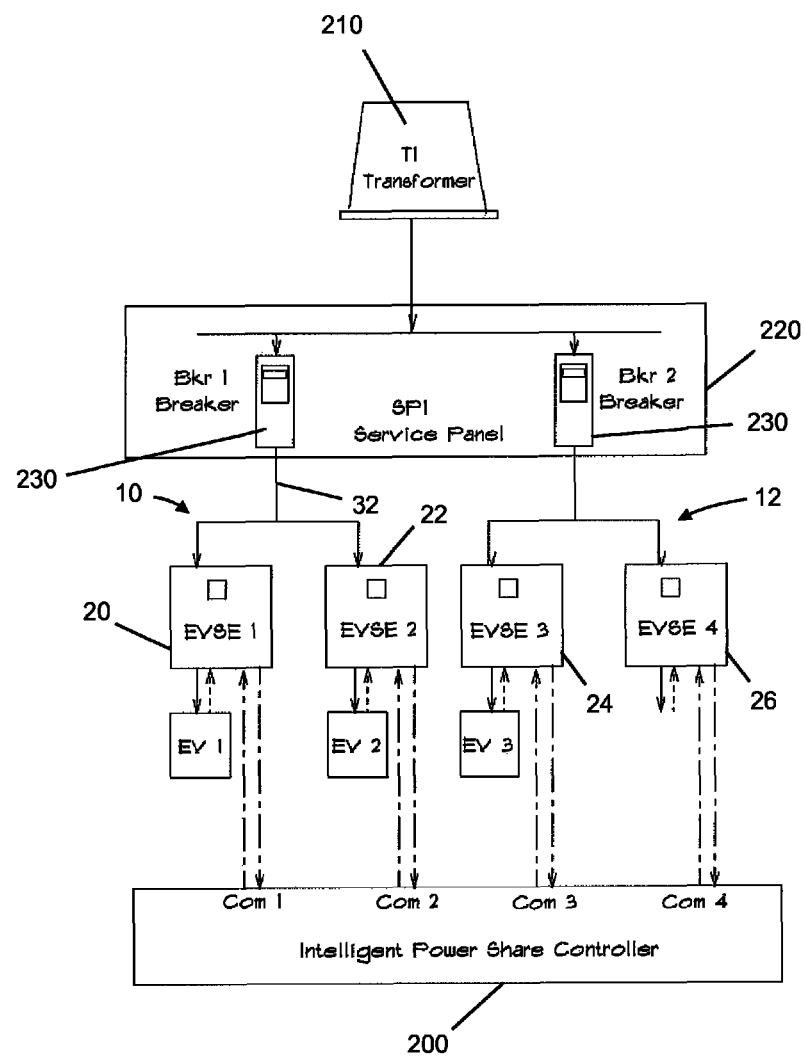
FIG. 4 is an annotated block diagram of a representative portion of an EV charging installation illustrating the operation of the power sharing system.

In a simplified explanatory embodiment illustrated in FIG. 4 for descriptive purposes, an IPS controller 200 is designed to communicate with EVSE units connected to a single transformer 210 and multiple service panels 220. The IPS controller 200 is programmed with the maximum rating for each of the components in the power distribution structure i.e., the primary transformer 210, service panels 220, breaker 230, and EVSE units. FIG. 4 illustrates two EVSE pairs. In one embodiment, the IPS controller 200 is configured to communicate with as many as 128 EVSE units.

The major cost reduction is achieved by grouping two EVSE units to share one breaker. This grouping reduces the cost of the electrical equipment by half while providing twice as many EVSE for the users. Even though the power source is effectively reduced to one-half, charging performance is minimally affected. This is achieved by an efficient approach wherein the IPS controller 200 continuously communicates with each EVSE on the power network.

The IPS controller 200 compiles a running log of current being drawn by each EVSE. When an additional electric vehicle is connected to an unused EVSE, the EVSE reports to the IPS controller 200 that it has a connected vehicle and is requesting power. The IPS controller 200 first checks to see how much current the companion EVSE is drawing. If the current is less than half the rating of the shared breaker i.e., a 40 amp breaker can supply 32 amps continuously and if the first EVSE is drawing 16 amps or less, the IPS controller 200 instructs the first EVSE to signal (via the pilot) the electric vehicle that only 16 amps are available. The IPS controller 200 then checks to see if allowing the second EVSE to add the additional 16 amps to the branch circuit will cause either the service panels or supply transformer to exceed their maximum rating. If not, then the second EVSE is allowed to turn on the power to the electric vehicle, and signal that vehicle, (via its pilot), that 16 amps are available.

When the first electric vehicle is fully charged and is drawing a minimum amount of current, the EVSE signals the IPS controller 200 that the charge is completed and it has signaled the connected electric vehicle that only standby current is available, typically 5 amps. The IPS controller 200 then instructs the companion EVSE that additional current is available (i.e., up to 27 amps). The companion EVSE then notifies (via the pilot) the connected electric vehicle that additional power is available.

In a preferred embodiment, the current is measured by a separate circuit in each EVSE. The measuring current is reported to the payment station or gateway module for bi-directional controller communicator with IPS 200 which in turn transmits a message back to the EVSE to increase or reduce the current supplied to the EVSE.

When the first electric vehicle is completely removed from the first EVSE, a signal is sent from the first EVSE to the IPS controller 200 of the event. The IPS controller 200 then signals the companion EVSE that the full power is available, i.e., up to 32 amps.

Because the IPS controller 200 is continuously monitoring the current being drawn by all EVSE units on its network, it will recognize when one or more components are approaching their maximum rating. When a maximum rating is reached, the IPS controller will instruct all associated EVSE units to reduce their available power by a percentage until the power is in the operating range.

The IPS controller 200 has multiple capabilities and transmits appropriate commands to the EVSE units based on numerous inputs. The IPS controller 200 monitors ambient temperature and reduces the maximum operating range as the ambient temperature rises. The IPS controller 200 also monitors the current being drawn on each phase of the 3 phase transformer. When the current drawn on one phase substantially exceeds the current drawn on the other phases, the IPS controller will instruct each EVSE on the one loaded phase to reduce the available power by a calculated percentage to bring that phase into balance.

The IPS controller 200 can be programmed to reduce the overall power available during peak periods. It can also be programmed to turn off all EVSE units during the evenings or on weekends.

The IPS controller 200 can also respond to signals received from remote Demand Response Application Servers (DRAS).

With additional reference to FIG. 4, a representative tandem EVSE station 10, which communicates with a payment module 110 or a gating module 112, is generally designated by the numeral 10. A second tandem EVSE station is designated generally by the numeral 12. EVSE station 10 comprises a first EVSE unit and a second EVSE unit designated as EVSE 20 and EVSE 22, respectively. A single power line 32 connects via a circuit breaker 230 to provide a source of power to the EVSE station 10. The EVSE station 10 communicates with controller 200 which is responsive to various inputs from each of the EVSE units 20 and 22 to control the charge current for the tandem EVSE units. The controller 200 provides command signals to a power control for each of the respective EVSE units 20 and 22 to allocate the power between EVSE 20 and EVSE 22 in an efficient manner as required for charging the electric vehicles.

Each EVSE will default to its full 30 A capacity when it is not connected to the EV. The controller 200, which may be incorporated in a payment station 110 or a gateway 112, has a knowledge of which EVSE pairs (e.g., EVSE 20 and EVSE 22 for station 10; EVSE 24 and EVSE 26 for station 12) are sharing a breaker and the breaker size. In most cases, the size of the shared circuit breaker is 40 A. The controller 40 functions to manage the power utilized by each EVSE such that the total current drawn by the pair of EVSE units does not exceed the 80% capacity of the circuit breaker (which, for a 40 A breaker, is 32 A). Naturally, if the EVSE units are sharing a 50 A breaker; the total current cannot exceed 40 A.

A new command is added to the command settings of EVSE 20 and EVSE 22 so that each EVSE can be limited to a specific charge current value. The range in current setting values is preferably from 6 A to 30 A.

Figure 5:
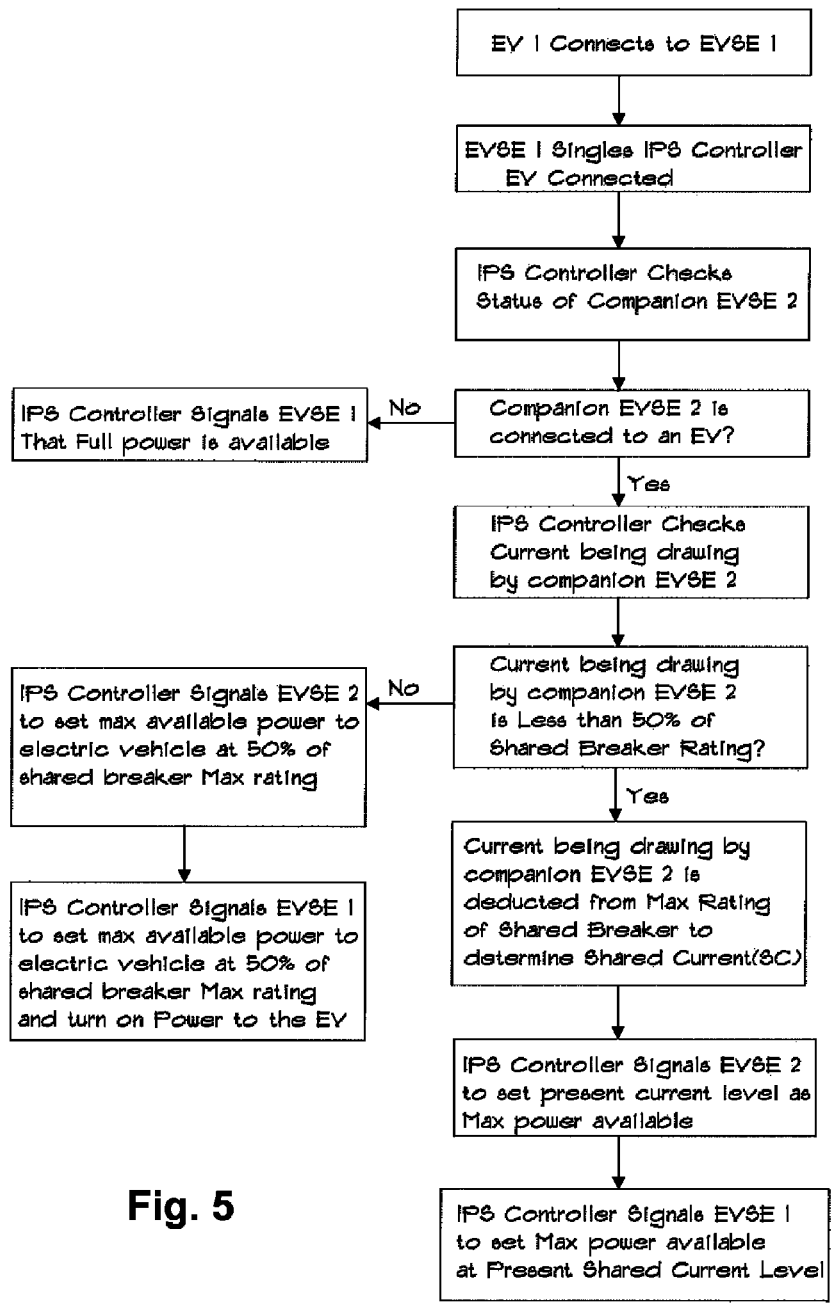
FIG. 5 is a flowchart illustrating representative operational steps employed by the power sharing system.

Representative steps for an EVSE station with two power sharing EVSE units illustrating the power sharing system is illustrated in the flowchart of FIG. 5. It should be appreciated that multiple EVSE stations are preferably controlled by the IPS controller 200. The power sharing system for an EVSE station comprising an EVSE 20 and its companion EVSE 22 is described below.

Representative EVSE Control Sequence:
1. One of the EVSE units is connected to an EV and begins to charge. The other EVSE unit of the breaker-sharing pair is not connected to an EV so the connected EVSE is allowed to charge at its full capacity of 30 A. For descriptive purposes, the charging EVSE is arbitrarily designated as EVSE 20 and the non-charging EVSE is arbitrarily designated as EVSE 22. The controller 200 does not effectively intervene in the charging levels at this stage.
2. Another EV pulls up and is connected to the second EVSE 22 while the first EVSE 20 is charging. The controller 200 senses the latter event and sends a command to both EVSE 20 and EVSE 22 to limit their current to 16 A (so that the circuit breaker capacity is not exceeded).
3. Subsequently, if either EVSE stops charging, either due to being unplugged from the EV or the EV being fully charged, the controller 200 will restore the EVSE that is still actively charging to its full capacity of 30 A.
4. If the communication is lost between the controller 200 and an EVSE, the EVSE will default to 16 A. The controller 200 will also default the other shared EVSE to 16 A to prevent the capacity of breaker 230 from being exceeded.

Enhanced Representative EVSE Control Sequence with Charge Optimization:

When both EVSE 20 and EVSE 22 sharing the breaker are actively charging, it is possible that one or the other of the connected EV will not be utilizing the full 16 A allocated to it. For example, one EV may only be using 12 A. This allows the other EVSE to utilize the remaining 20 A.

A sequence for charge optimization when sharing a 40 A breaker is detailed below:
1. When both EVSE 20 and EVSE 22 are actively charging EVs, and at least three minutes have elapsed since the last EV was connected for charging, the charge currents from both EVSE units are evaluated by the controller 200 to determine if they could be optimized.
2. If neither EV is drawing the full 16 A allocated to it, the controller 200 does not need optimize the charge limits of each EVSE beyond the initial 16 A setting.
3. If one EVSE is drawing only 12 A and the other EVSE is drawing the full 16 A allocated to it, the EVSE that is drawing 12 A should have its current limit reduced to 12 A by the controller 200 transmitting an appropriate command to the EVSE current control, and the other EVSE should have its current limit raised to 20 A by the controller 200 transmitting an appropriate command to the companion EVSE current control.
4. This will allow the EV that potentially could use more than 16 A have more charge current available for charging when not required by the other EV.
5. The charge currents for each of EVSE 20 and EVSE 22 are periodically evaluated and compared by the controller 200, and adjusted as described above.

While preferred embodiments of the foregoing have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A method for sharing power between a first EVSE and a second EVSE sharing a circuit breaker having a pre-established current rating and a reduced current capacity comprising:
   connecting a first EVSE to an EV to begin a charge;
   charging said first EV at a charge limited by the current capacity while the second EVSE is not connected to an EV;
   connecting said second EVSE to an EV to begin a charge;
   transmitting a command to the first EVSE and the second EVSE to limit the charge of each to no more than one-half the current capacity;
   if either the first EVSE or the second EVSE stops charging, transmitting a restore command to charge the first EVSE or the second EVSE that does not stop charging at a charge limited by the current capacity;
   at a pre-established time after charging the second EVSE, evaluating the charge current of the first EVSE and the second EVSE;
   if the charging current of the first EVSE or the second EVSE is below one-half the current capacity, transmitting a reduce command to one of the first EVSE or the second EVSE and an increase command to the other of the first EVSE or the second EVSE, respectively, to reduce and increase the charge to the one and the other EVSE, respectively.

2. The method of claim 1 further comprising replicating the method for multiple pairs of a first EVSE and a second EVSE.

3. The method of claim 2 wherein a single controller controls all of the EVSE units.

4. The method of claim 1 further comprising compiling a running log of power drawn by the first and the second EVSE units.

5. The method of claim 1 further comprising sensing ambient temperatures and correspondingly reducing the current capacity.

6. The method of claim 1 further comprising automatically restructuring the current capacity during periods of peak power demand.

7. The method of claim 1 further comprising automatically terminating power during pre-established time periods.

8. The method of claim 1 further comprising measuring the current at each EVSE.

9. The method of claim 1 further comprising transmitting current measurements to a controller which transmits command signals back to said first and second EVSE units.

10. An EVSE installation connected to a circuit breaker having a pre-established current rating and a reduced current capacity comprising:
 a first EVSE having a first current control and connectable for power communication with said circuit breaker;
 a second EVSE having a second current control and connectable for power communication with said circuit breaker;
 an installation controller which issues command signals to said first and said second current controls;
 a first sensor for sensing the power drawn by said first EVSE and communicating with said installation controller; and
 a second sensor sensing the power drawn by said second EVSE and communication with said installation controller;
 wherein said installation controller transmits a command to the first EVSE and a command to the second EVSE to limit the charge of each to no more than one-half the current capacity when said first EVSE and said second EVSE are connected for charging;
 said installation controller issuing a restore command to the first EVSE to charge at one EVSE at a charge limited by the current capacity while the other EVSE is not connected to an EV or has stopped charging; and
 said installation controller, at a pre-established time after charging a second EVSE evaluating the charge current sent by said first sensor and said second sensor so that if the charging current of one of the first EVSE or the second EVSE is below one-half the current capacity, said installation controller transmits a reduce command to the EVSE and an increase command to the other of the EVSE to charge each EVSE at a reduced current charge and an increased current charge, respectively.

11. The EVSE installation of claim 10 wherein each said first and second current control has a range of 6 A to 30 A.

12. The EVSE installation of claim 10 wherein said installation controller is disposed at a pay station module or a gateway module.

13. The EVSE installation of claim 10 wherein a said pay station module of a gateway module communicates over a Zigbee multi-network with said first and second EVSE units.

14. The EVSE installation of claim 10 wherein said first sensor and said second sensor each comprise a measuring circuit at said first and said second EVSE, respectively.

15. An integrated installation comprising a multiplicity of EVSE installations of claim 10.

16. The integrated system of claim 15 wherein said installation controller controls all of the EVSE units.

* * * * *